United States Patent
Lai et al.

(10) Patent No.: US 10,474,288 B2
(45) Date of Patent: Nov. 12, 2019

(54) TOUCH CONTROL METHOD FOR TOUCH DEVICE

(71) Applicant: NOVATEK Microelectronics Corp., Hsin-Chu (TW)

(72) Inventors: Chih-Chang Lai, Taichung (TW); Kuan-Yi Yang, Hsinchu County (TW); Jer-Hao Hsu, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/979,488

(22) Filed: May 15, 2018

(65) Prior Publication Data

US 2018/0260075 A1 Sep. 13, 2018

Related U.S. Application Data

(63) Continuation-in-part of application No. 14/970,559, filed on Dec. 16, 2015, now Pat. No. 9,996,187.

(60) Provisional application No. 62/167,279, filed on May 28, 2015.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01)

(58) Field of Classification Search
CPC ............. G06F 3/0416; G06F 3/044; G06F 3/041–047; G06F 2203/04101–04113
See application file for complete search history.

(56) References Cited

U.S. PATENT DOCUMENTS

| | | | |
|---|---|---|---|
| 8,054,300 B2 | 11/2011 | Bernstein | |
| 2008/0165154 A1* | 7/2008 | Kim | G06F 3/0414 345/173 |
| 2014/0320428 A1* | 10/2014 | Matsuda | G06F 3/0416 345/173 |
| 2014/0340350 A1 | 11/2014 | Chen | |
| 2015/0002448 A1 | 1/2015 | Brunet | |

(Continued)

FOREIGN PATENT DOCUMENTS

| | | |
|---|---|---|
| CN | 101598986 A | 12/2009 |
| CN | 102214026 A | 10/2011 |
| CN | 102880338 A | 1/2013 |

(Continued)

*Primary Examiner* — Stephen G Sherman
(74) *Attorney, Agent, or Firm* — Winston Hsu

(57) ABSTRACT

A touch control method for sensing one or more touch signals from a touch device having a plurality of sensing areas, each of the sensing areas having a plurality of touch units, the touch control method includes determining a sensitivity of the touch device; and sensing the one or more the touch signals from the touch device, wherein one or more of the plurality of touch units located in the same sensing area are grouped so as to achieve the sensitivity, and for a first sensitivity of the touch device, a first number of touch units are grouped in the same sensing area, and for a second sensitivity of the touch device, a second number of touch units are grouped in the same sensing area, and the second sensitivity is greater than the first sensitivity and the second number is greater than the first number.

20 Claims, 9 Drawing Sheets

(56) References Cited

U.S. PATENT DOCUMENTS

2015/0212724 A1* 7/2015 Manba ............... G06F 3/0488
   715/794

FOREIGN PATENT DOCUMENTS

| CN | 103207718 A | 7/2013 |
| CN | 103914175 A | 7/2014 |
| CN | 104133594 A | 11/2014 |
| CN | 104657015 A | 5/2015 |
| TW | 201403402 A | 1/2014 |
| TW | 201415124 A | 4/2014 |
| TW | 201516772 A | 5/2015 |
| WO | 2008062217 A2 | 5/2008 |

* cited by examiner

TOUCH CONTROL METHOD FOR TOUCH DEVICE

CROSS REFERENCE TO RELATED APPLICATIONS

This application is a continuation-in-part application of Ser. No. 14/970,559, which further claims the benefit of U.S. Provisional Application No. 62/167,279 filed on 2015May 28.

BACKGROUND OF THE INVENTION

1. Field of the Invention

The present invention relates to a touch control method for a touch device, and more particularly, to a touch control method capable of increasing sensitivity of a touch device.

2. Description of the Prior Art

Along with the development of the touch sensing technique, the commercially available touch panels are extensively used for various sizes or products such as mobile phone, GPS navigator system, tablet PC, PDA, and laptop PC, owing to their convenience and practicality.

The panel manufacturers continue to develop thinner and more accurate touch panels. In recent year, touch panels of an in-cell structure attract lots of attention. Via building sensing elements inside the display structure of the panel, the in-cell structure eliminates a layer. The visible distance between the user's finger and what the user is touching on the touch panel is therefore reduced, creating a more direct contact with the content displayed and enabling taps and gestures to be more responsive. In addition, the touch panel becomes thinner since the layer is eliminated in the in-cell structure.

The touch panel of the in-cell structure senses the touches according to capacitance variances of a plurality of touch pads in response to the touches. A smaller area of each of the touch pads can acquire a greater touch resolution of the touch panel. However, the capacitance variance generated by each of the touch pads also becomes smaller when the area of each of the touch pads decreases. The touch panel may fail to determine a hover operation because the capacitance variance generated by each of the touch pads is too small to be determined when the user's hand maintains a certain distance with the touch panel. Thus, how to improve the reliability of determining the hover operation while maintaining the fine touch resolution of the touch panel becomes a topic to be discussed.

SUMMARY OF THE INVENTION

In order to solve the above problem, the present invention provides a touch control method capable of increasing sensitivity of a touch device.

In an aspect, the present invention discloses a touch control method for sensing one or more touch signals from a touch device, wherein the touch device has a plurality of sensing areas and each of the sensing areas having a plurality of touch units. The touch control method comprises determining a sensitivity of the touch device; and sensing the one or more the touch signals from the touch device, wherein one or more of the plurality of touch units located in the same sensing area are grouped so as to achieve the sensitivity, and for a first sensitivity of the touch device, a first number of touch units are grouped in the same sensing area, and for a second sensitivity of the touch device, a second number of touch units are grouped in the same sensing area, and the second sensitivity is greater than the first sensitivity and the second number is greater than the first number.

In another aspect, the present invention discloses a touch control method for sensing one or more touch signals from a touch device having a plurality of sensing areas, wherein each of the sensing areas having a plurality of touch units. The touch control method comprises alternately, grouping the plurality of touch units located in the same sensing area; determining a plurality of first capacitance variances in the plurality of sensing areas and determining a plurality of second capacitance variances in the plurality of touch units, separately, in each of the sensing areas, to sense one or more touch signals; and adjusting a frequency of alternately grouping the plurality of touch units in each of the sensing areas.

In another aspect, the present invention discloses a touch control method for sensing one or more touch signals from a touch device having a plurality of sensing areas, each of the sensing areas having a plurality of touch units, the touch control method comprises calculating a first sensing value according to a first plurality of touch signals from a first number of touch units located in the same sensing area to provide a first sensitivity of the touch device; and calculating a second sensing value according to a second plurality of touch signals from a second number of touch units located in the same sensing area to provide a second sensitivity of the touch device, wherein the second sensitivity is greater than the first sensitivity, and the second number is greater than the second number.

In another aspect, the present invention discloses a computer system, comprises a processing device; and a memory device coupled to the processing device, for storing a program code instructing the processing device to perform a touch control method, wherein the touch control method comprises determining a sensitivity of the touch device; grouping one or more of the plurality of touch units located in the same sensing area so as to achieve the sensitivity of the touch device; and sensing the one or more the touch signals from the touch device.

In another aspect, the present invention discloses a non-transitory machine-readable medium having information recorded thereon for rendering touch units of a touch device, wherein the information, when read by the machine, causes the machine to perform determining a sensitivity of the touch device; grouping one or more of touch units located in the same sensing area so as to achieve the sensitivity of the touch device; and sensing the one or more the touch signals from the touch device.

In another aspect, the present invention discloses a control logic coupled to a touch device, configured to receive touch information and render the touch information into control signals for driving the touch device, to perform determining a sensitivity of the touch device; grouping one or more of the touch units located in the same sensing area so as to achieve the sensitivity of the touch device; and sensing the one or more the touch signals from the touch device.

In another aspect, the present invention discloses a touch control module for sensing one or more touch signals from a touch device having a plurality of touch units, the touch control module comprises a sensing module, coupled to the touch units, and configured to obtain the one or more touch signals from the touch device, and generate a sensing result based on the one or more touch signals; wherein under an operation of a first sensitivity of the touch device, the sensing module generates a sensing result based on the one or more touch signals from the touch units which are divided into a first number of sensing areas each including a first number of one or more touch units of the touch units, and under an operation of a second sensitivity of the touch device, the sensing module generates a sensing result based on the one or more touch signals from the touch units which are divided into a second number of sensing areas each including a second number of one or more touch units of the touch units; wherein the first sensitivity is different from the second sensitivity and the first number is different from the second number, such that different numbers of touch units are used to provide touch information and the touch device therefore has different sensitivities.

By utilizing the touch control method of the present invention, not only the sensitivity of the touch device can be increased but also the power consumption of the touch device can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
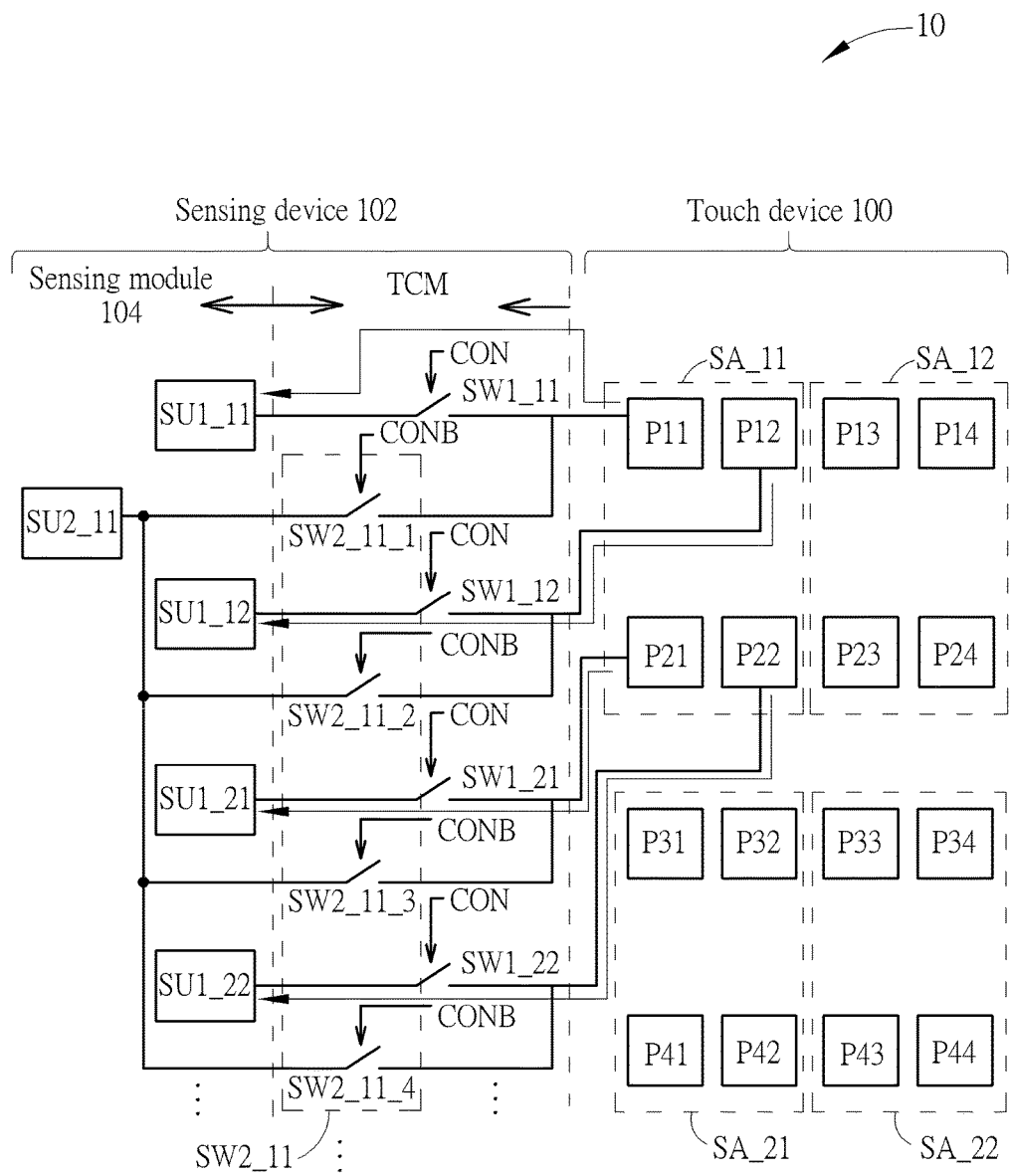
FIG. 1 is a schematic diagram of an electronic system according to an example of the present invention.

Please refer to FIG. 1, which is a schematic diagram of an electronic system 10 according to an example of the present invention. The electronic system 10 may be an electronic product such as a smart phone, a tablet or a notebook, and is not limited herein. As shown in FIG. 1, the electronic system 10 comprises a touch device 100 and a sensing device 102. Note that, the components not directly related to the concept of the present invention, such as housing, display components, and display control circuit, are not shown in FIG. 1 for brevity. The touch device 100 may be a touch pad configured in a display panel and comprises a plurality of touch units P11-Pmn (e.g. sensing pads). FIG. 1 shows touch units P11-P44 for illustrations. The touch device 100 is utilized for generating capacitance variances in response to at least one approaching or touch of an object (e.g. a fingertip or a stylus pen). The sensing device 102 comprises a touch control module TCM and a sensing module 104 and is utilized for determining the capacitance variances generated by the touch units P11-Pmn. In this example, the touch control module TCM is capable of connecting the multiple touch units among the touch units P11-Pmn (e.g. the touch units P11, P12, P21, and P22), so as to increase the sensitivity of the touch device 100.

In details, the touch control module TCM comprises switch units $SW1\_11$-$SW1\_mn$ and $SW2\_11$-$SW2\_ij$, wherein the switch units $SW1\_11$-$SW1\_22$ and $SW2\_11$ are shown in FIG. 1 for illustrations. The switch units $SW1\_11$-$SW1\_mn$ are respectively coupled between one of the touch units P11-Pmn and one of sensing units $SU1\_11$-$SU1\_mn$ of the sensing module 104, and each of the switch units $SW2\_11$-$SW2\_ij$ is coupled between the touch units located in one of a plurality of sensing areas $SA\_11$-$SA\_ij$ and one of the sensing units $SU2\_11$-$SU2\_ij$. Each of the sensing areas $SA\_11$-$SA\_ij$ comprises multiple neighborhood touch units among the touch units P11-Pmn and the sensing module 104. In FIG. 1, the touch units P11, P12, P21, and P22 are coupled to the switch units $SW1\_11$, $SW1\_12$, $SW1\_21$, and $SW1\_22$, respectively, and the sensing units $SU1\_11$, $SU1\_12$, $SU1\_21$, and $SU1\_22$ are coupled to the switch units $SW1\_11$, $SW1\_12$, $SW1\_21$, and $SW1\_22$. The sensing area $SA\_11$ comprises touch units P11, P12, P21, and P22 that form a 2*2 touch unit array; the sensing area $SA\_12$ comprises touch units P13, P14, P23, and P24 that form another 2*2 touch unit array; and so on. The touch control module TCM selects to conduct the switch units $SW1\_11$-$SW1\_mn$ or the switch units $SW2\_11$-$SW2\_ij$ according to a control signal CON and an inverse control signal CONB which is an inverse signal of the control signal CON. The control signal CON and the inverse control signal CONB are generated by a control unit (not shown in FIG. 1) and the control unit maybe configured in the sensing module 104. In an example, the switch units $SW1\_11$-$SW1\_mn$ are conducted in a normal mode, the switch units $SW2\_11$-$SW2\_ij$ are conducted in a grouping mode, and the switch units $SW1\_11$-$SW1\_mn$ and the switch units $SW2\_11$-$SW2\_ij$ are not conducted simultaneously.

In a normal mode, the switch units $SW1\_11$-$SW1\_mn$ are conducted. The sensing units $SU1\_11$-$SU1\_mn$ of the sensing module 104 receive the signals related to capacitance variances $CV1\_11$-$CV1\_mn$ respectively generated in the touch units P11-Pmn. The sensing module 104 determines the capacitance variances $CV1\_11$-$CV1\_mn$ respectively generated in the touch units P11-Pmn and accordingly determines the touch positions at which the object approaches or contacts. Since the capacitance variances $CV1\_11$-$CV1\_mn$ are respectively generated by the touch units P11-Pmn, the sensing module 104 is able to determine the approaching or the contact of the object in a fine touch resolution of the level of touch units P11-Pmn. When the object maintains a certain distance respect to the touch device 100 (e.g. perform a hover operation), however, the capacitance variance generated by each of the touch units P11-Pmn reduces significantly. For example, when the object contacts the touch device 100 (i.e. the distance between the object and the touch device 100 is 0), the capacitance variances generated in each of the touch units contacted by the object may be 0.9 pF. In comparison, when the distance between the object and the touch device 100 is 1 mm, the capacitance variances generated in each of the touch units close to the object may reduce to 0.1 pF. Under such a condition, the capacitance variance generated by each of the touch units P11-Pmn in response to the approaching of the object may be too small to make the sensing module 104 determine the approaching of the object.

In order to increase the sensitivity of the touch device 100, the touch device 100 change to operate in a grouping mode. In the grouping mode, the control unit adjusts the control signal CON and the inverse control signal CONB to make the touch control module TCM disconnect the switch units $SW1\_11$-$SW1\_mn$ and conduct the switch units $SW2\_11$-

Figure 2:
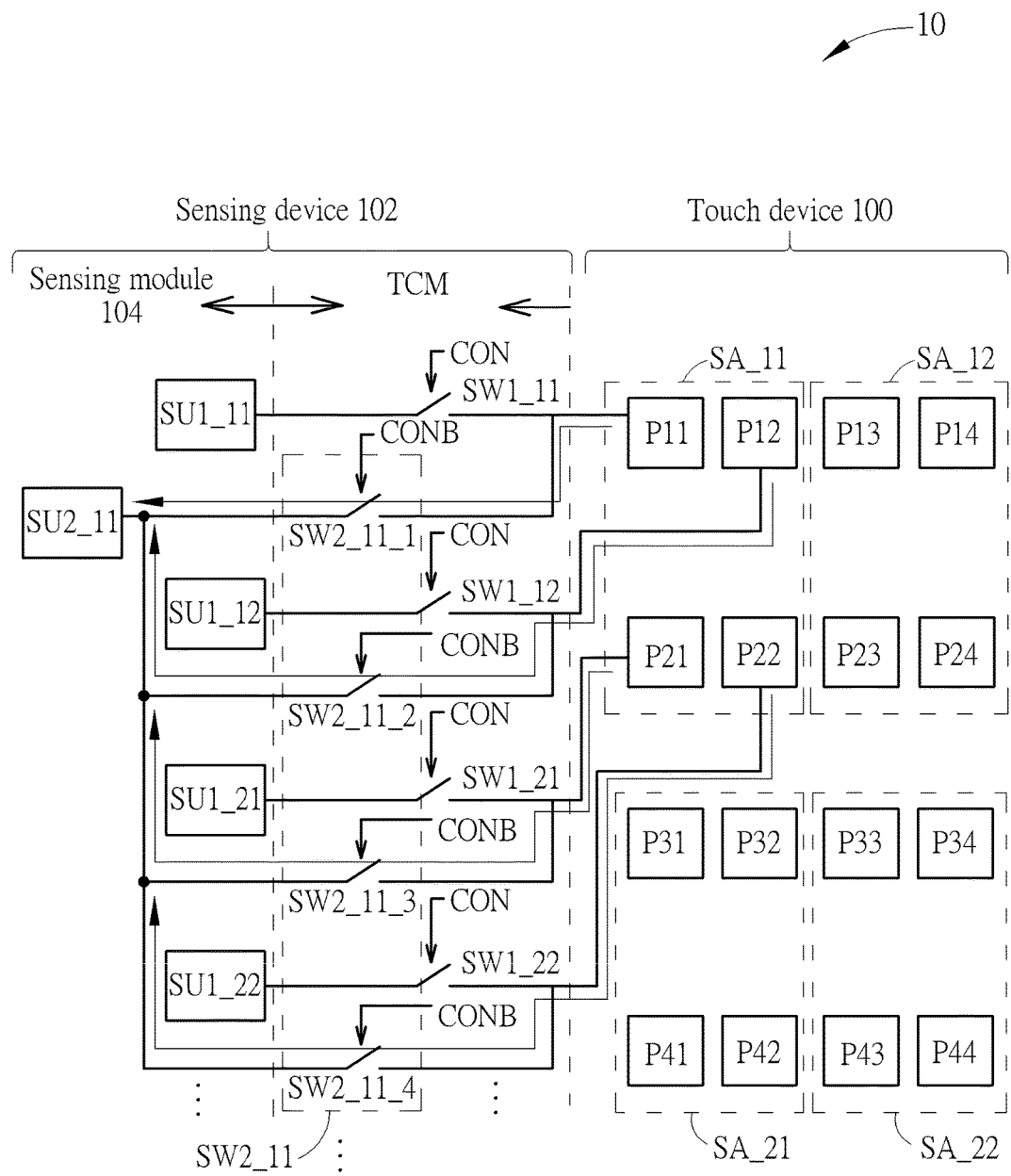
FIG. 2 is a schematic diagram of an electronic system according to an example of the present invention.

SW2_ij, to connect the touch units in the same sensing area together. Please refer to FIG. 2, the touch units in the same sensing area are connected together by the switch units SW2_11-SW2_ij (e.g. the touch units P11, P12, P21, and P22 are connected together when switches SW2_11_1-SW2_11_4 of the switch unit SW2_11 are conducted). The sensing module 104 changes to use the sensing units SU2_11-SU2_ij to determine capacitance variances CV2_11-CV2_ij jointly generated by the touch units in the same sensing area among the sensing areas SA_11-SA_ij. Since the number of touch units of generating each of the capacitance variances CV2_11-CV2_ij is greater than that of touch units of generating each of the capacitance variances CV1_11-CV1_mn, the area of generating each of the capacitance variances CV2_11-CV2_ij (i.e. the area of each of the sensing areas SA_11-SA_ij) is greater than that of generating each of the capacitance variances CV1_11-CV1_mn (i.e. the area of each of the touch units P11-Pmn). Thus, the capacitance variances CV2_11-CV2_ij in response to the approaching or the contact of the object are greater than the capacitance variances CV1_11-CV1_mn in response to the approaching or the contact of the object. In other words, the capacitor variances CV2_11-CV2_ij generated in response to the approaching or the contact of the object and sensed by the sensing module 104 are enlarged. According to the enlarged capacitor variances CV2_11-CV2_ij, the sensing module 104 is able to determine the approaching of the object when the object maintains a certain distance with the touch device 100 and the capacitance variance generated by each of the touch units P11-Pmn is too small to allow the sensing module 104 to determine the approaching of the object. The sensitivity of the touch device 100 is therefore increased. In addition, the power consumption of the sensing module 104 decreases when conducting the switch units SW2_11-SW2_ij because the number of times of scanning the capacitance variances generated in the touch device 100 is decreased from m*n to i*j and the time of scanning the capacitance variances in the touch device 100 is also decreased.

Note that, the switch unit SW1_11 and the switch SW2_11_1 of the switch unit SW2_11 can be regarded as a multiplexer controlled by the control signal CON and the inverse control signal CONB; the switch unit SW1_12 and the switch SW2_11_2 of the switch unit SW2_11 can be regarded as another multiplexer controlled by the control signal CON and the inverse control signal CONB; and so on. In other words, the touch control module TCM shown in FIG. 1 can be realized by a plurality of multiplexers controlled by the control signal CON and the inverse control signal CONB. The multiplexers conduct the connections between each of the touch units P11-Pmn and each of the sensing units SU1_11-SU1_mn or conduct the connections between each of the touch units P11-Pmn and each of the sensing units SU2_11-SU2_ij according to the control signal CON.

Figure 3:
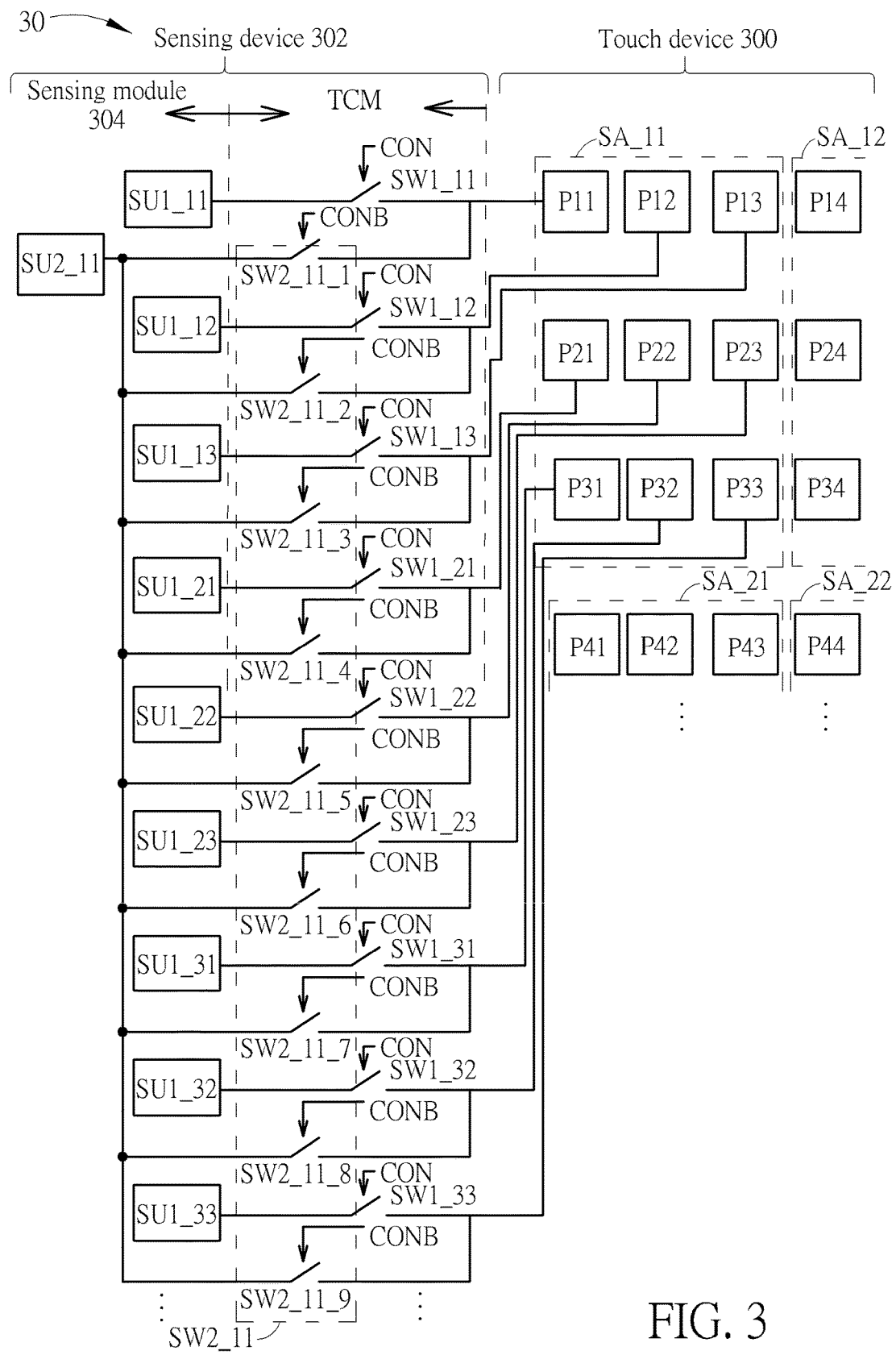
FIG. 3 is a schematic diagram of an electronic system according to an example of the present invention.

According to different applications and design concepts, the number of the touch units connected by the switch units SW2_11-SW2_ij can be altered. Please refer to FIG. 3, which is a schematic diagram of an electronic system 30 according to an example of the present invention. The electronic system 30 may be an electronic product such as a smart phone, a tablet or a notebook, and is not limited herein. Because the electronic system 30 is similar to the electronic system 10 shown in FIG. 1, the components and signals with the same functions use the same symbols. In FIG. 3, each of the sensing areas SA_11-SA_ij comprises 9 touch units that form a 3*3 touch unit array. For example, the sensing area SA_11 comprises the touch units P11-P13, P21-P23, and P31-P33 in FIG. 3. When the switch units SW2_11-SW2_ij are conducted in the grouping mode, the touch units located in the same sensing area are connected together and the sensing units SU2_11-SU2_ij respectively determine the capacitance variances CV2_11-CV2_ij in the sensing areas SA_11-SA_ij. Since the areas of the sensing areas SA_11-SA_ij increases in FIG. 3, the sensitivity of the electronic system 30 determining the approaching or the contact of the object is further increased. In addition, the number of times of scanning the capacitance variances generated by the touch device 300 in FIG. 3 is a ninth of the number of times of scanning the capacitance variances generated by the touch device 100 in FIG. 1. The power consumption of the sensing module 304 is reduced with the number of times of scanning the capacitance variances.

The timing of the sensing module 104 switching to conduct the switch units SW1_11-SW1_mn or SW2_11-SW2_ij may be various. In an example, the sensing module 104 changes to conduct the switch units SW2_11-SW2_ij when determining that the electronic system 10 performs a specific function that does not require high touch resolution (e.g. an electronic book application). When determining that the electronic system 10 ends the specific function, the sensing module 104 changes to conduct the switch units SW1_11-SW1_mn.

In an example, the sensing module 104 changes to conduct the switch units SW2_11-SW2_ij when determining the object perform a predefined touch pattern. For example, the predefined touch pattern may be "S" pattern. When determining that the object draws "S" according to the capacitance variances CV1_11-CV1_mn, the sensing module 104 changes to conduct the switch units SW2_11-SW2_ij. In another example, the predefined touch pattern may be a contact pattern of the object. For example, when the sensing module 104 determines that, according to the capacitance variances CV1_11-CV1_mn, the object contacts an area larger than a fourth area of a total touch area of the touch device 100, the sensing module 104 disconnects the switch units SW1_11-SW1_mn and conducts the switch units SW2_11-SW2_ij.

In another example, the sensing module 104 changes to conduct the switch units SW2_11-SW2_ij according to the capacitance variances CV1_11-CV1_mn and a signal transmitted from the object. For example, the object may be a stylus pen capable of transmitting a signal in a specific frequency band. When determining receiving the signal in the specific frequency band (i.e. determines the object is the stylus pen) and the capacitance variances in response to the approaching or the contact of the object exceeds a threshold, the sensing module 104 changes to conduct the switch units SW2_11-SW2_ij. When the signal in the specific frequency band disappears or the capacitance variances in response to the approaching or the contact of the object become smaller than the threshold, the sensing module 104 disconnects the switch units SW2_11-SW2_ij and conducts the switch units SW1_11-SW1_mn.

In an example, the sensing module 104 alternately conducts the switch units SW1_11-SW1_mn and the switch units SW2_11-SW2_ij and adjusts the ratio between the times of conducting the switch units SW1_11-SW1_mn and those of conducting the switch units SW2_11-SW2_ij. For example, the sensing module 104 conducts the switch units SW1_11-SW1_mn for determining the capacitance variances CV1_11-CV1_mn 7 times and conducts the switch units SW2_11-SW2_ij for determining the capacitance variances CV2_11-CV2_ij 3 times per 10 times of scanning the capacitance variances in the touch device 100. When determining the capacitance variances in responses to the approaching or the contact of the object among the capacitance variances $CV1\_11$-$CV1\_mn$ and $CV2\_11$-$CV2\_ij$ are saturated, the sensing module 104 changes to conduct the switch units $SW2\_11$-$SW2\_ij$ 7 times and to conduct the switch units $SW1\_11$-$SW1\_mn$ 3 times per 10 times of scanning the capacitance variances in the touch device 100. In an example, the capacitance variances in responses to the approaching or the contact of the object and among the capacitance variances $CV1\_11$-$CV1\_mn$ are saturated if capacitance variances in responses to the approaching or the contact of the object reach a threshold TH1, and the capacitance variances in responses to the approaching or the contact of the object and among the capacitance variances $CV2\_11$-$CV2\_ij$ are saturated if capacitance variances in responses to the approaching or the contact of the object reach a threshold TH2. The threshold TH2 is greater than the threshold TH1 because the number of the touch units generating each of the capacitance variances $CV2\_11$-$CV2\_ij$ is greater than that of the touch units generating each of the capacitance variances $CV1\_11$-$CV1\_mn$. For example, the threshold TH2 is four times the threshold TH1 when each of the sensing areas $SA\_11$-$SA\_ij$ comprises 4 touch units. The sensing module 104 may change to conduct the switch units $SW1\_11$-$SW1\_mn$ 7 times and to conduct the switch units $SW2\_11$-$SW2\_ij$ 3 times per 10 times of scanning the capacitance variances in the touch device 100 when determining the capacitance variances in responses to the approaching or the contact of the object among the capacitance variances $CV1\_11$-$CV1\_mn$ maintain saturated and the capacitance variances in responses to the approaching or the contact of the object among $CV2\_11$-$CV2\_ij$ are not saturated.

In an example, the sensing module 104 disconnects the switch units $SW1\_11$-$SW1\_mn$ and conducts the switch units $SW2\_11$-$SW2\_ij$ when the electronic system 10 enters a power saving mode, to lower the power consumption of the sensing module 104. After the electronic system 10 wakes up and enters a normal operation mode, the sensing module 104 disconnects the $SW2\_11$-$SW2\_ij$ and changes to conduct the switch units $SW1\_11$-$SW1\_mn$.

The touch control module TCM of the above examples is capable of connecting multiple touch units in the touch device, to increase the sensitivity of the touch device. According to different application and design concepts, those skilled in the art may observe appropriate alternations and modifications. For example, the shapes of the sensing areas $SA\_11$-$SA\_mn$ is not limited to be rectangles. That is, the touch units in the same sensing area are not limited to form a rectangle. In an example, the shapes of the sensing areas $SA\_11$-$SA\_mn$ are rectangles, circles or half-circles.

Figure 4:
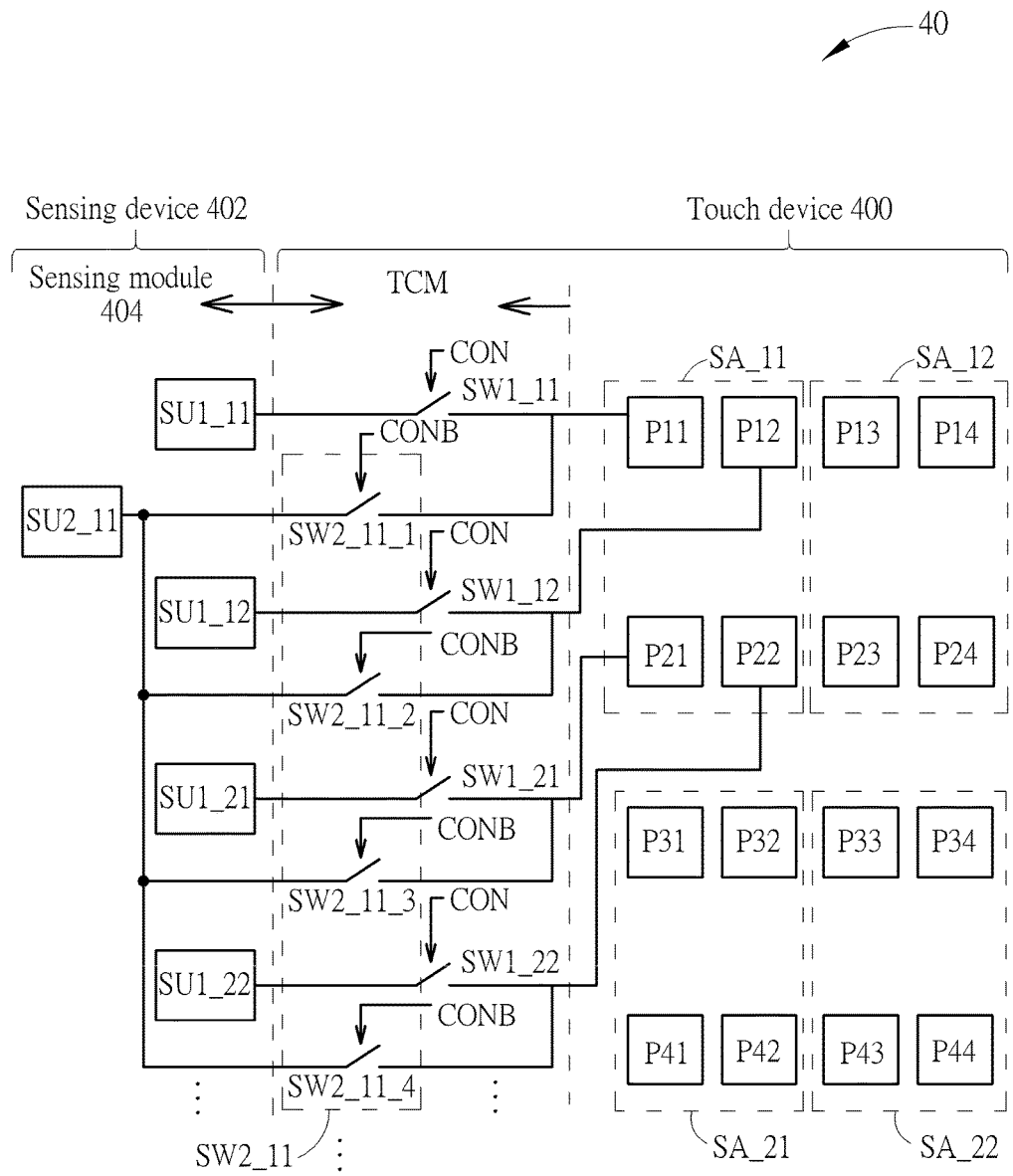
FIG. 4 is a schematic diagram of an electronic system according to an example of the present invention.

Please refer to FIG. 4, which is a schematic diagram of an electronic system 40 according to an example of the present invention. The electronic system 40 is similar to the electronic system 10 shown in FIG. 1, thus the components and signals with similar functions use the same symbols. Different from FIG. 1, the touch control module TCM changes to be configured in the touch device 400. The connection relationships between the touch units P11-Pmn and the switch units $SW1\_11$-$SW1\_mn$ and $SW2\_11$-$SW2\_ij$ shown in FIG. 4 can be referred to the above and are not narrated herein for brevity.

Figure 5:
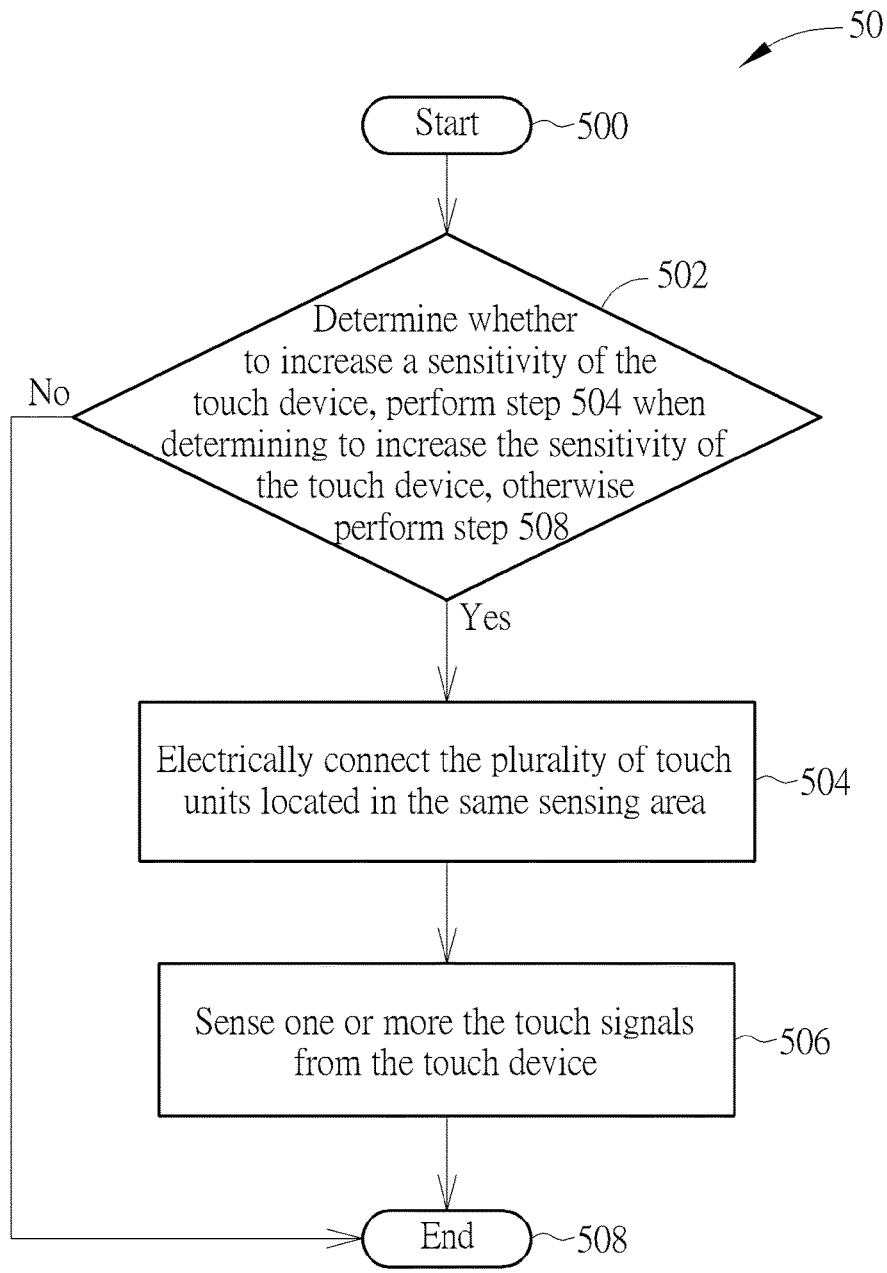
FIG. 5 is a flowchart of a process according to an example of the present invention.

The method of the touch control module switching the connection between the touch device and the sensing module in the above examples can be summarized into a process 50 shown in FIG. 5. The process 50 is utilized for sensing one or more touch signals from a touch device having a plurality of sensing areas, wherein each of the sensing areas has a plurality of touch units. The process 50 comprises the following steps:

Step 500: Start.

Step 502: Determine whether to increase a sensitivity of the touch device, perform step 504 when determining to increase the sensitivity of the touch device, otherwise perform step 508.

Step 504: Electrically connect the plurality of touch units located in the same sensing area.

Step 506: Sense one or more the touch signals from the touch device.

Step 508: End.

According to the process 50, the sensing module determines whether to increase a sensitivity of the touch device according to the operations of the electronic system. In an example, the sensing module determines to increase the sensitivity of the touch device when the touch device performs a specific function that does not require high touch resolution (e.g. an electronic book application). In another example, the sensing module determines to increase the sensitivity of the touch device when determining the one or more touch signals perform a predefined touch pattern on the touch device. The predefined touch pattern may be a move pattern of the object (e.g. "S" move pattern) or a contact pattern of the object. In still another example, the sensing module determines to increase the sensitivity of the touch device when receiving a signal in the specific frequency band from the object approaching the electronic system and determining the capacitance variances of the plurality of touch units in response to the approaching or the contact of the object exceeds a threshold. In an example, the sensing module determines to increase the sensitivity of the touch device when the touch device enters a power saving mode.

When determining to increase the sensitivity of the touch device, the touch units in each of a plurality of sensing areas are connected together. The shape of each of the sensing area may be altered according to different applications and design concepts. For example, each of the sensing areas may be a rectangle, a circle, or a half-circle. After the touch units in each of the sensing areas are connected, the touch control module determines the capacitance variances generated by the touch units in each of the sensing areas, to sense one or more touch signals from the touch device. Since the area of single touch units is smaller than that of the sensing areas comprising multiple touch units, the sensitivity of the touch device is increased when multiple touch units in the same sensing area are connected together.

Figure 6:
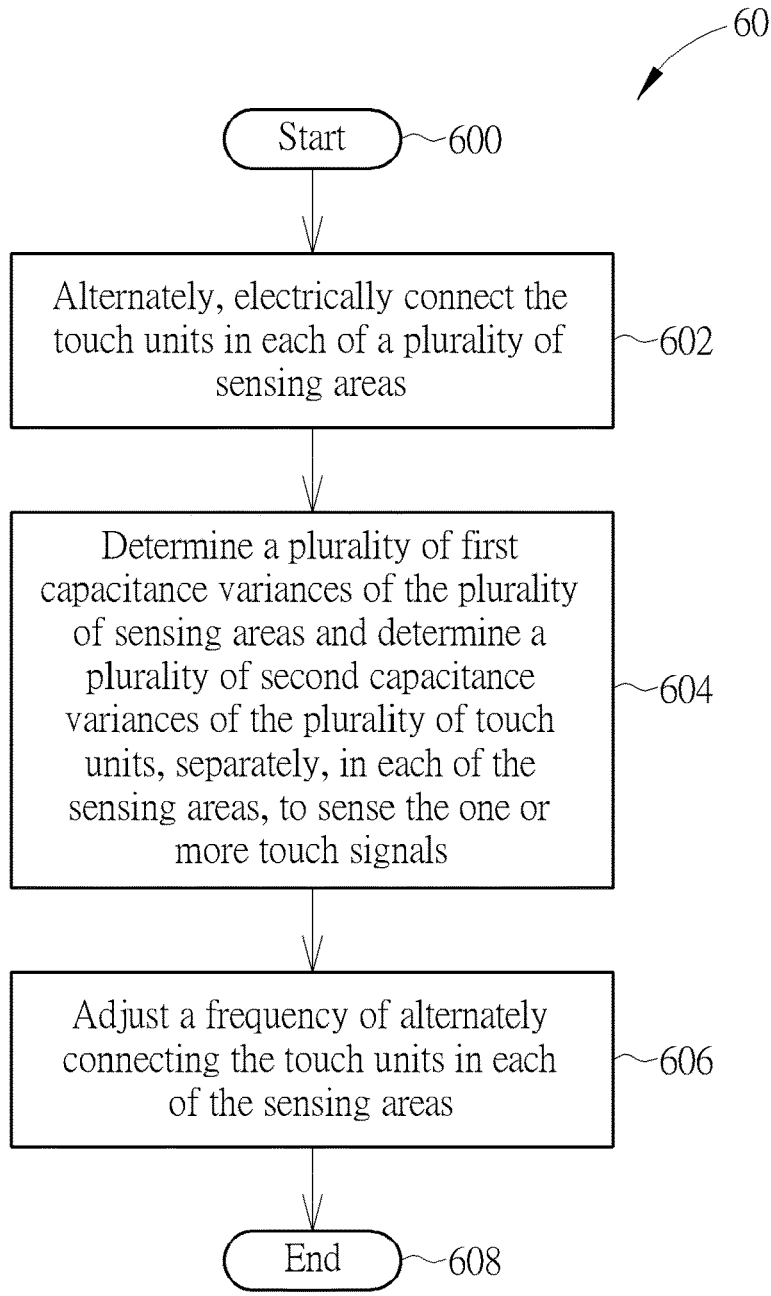
FIG. 6 is a flowchart of another process according to an example of the present invention.

The method of the touch control module switching the connection between the touch device and the sensing module in the above examples can be summarized into a process 60 shown in FIG. 6. The process 60 is utilized for sensing one or more touch signals from a touch device with a plurality of sensing areas, wherein each of the sensing areas has a plurality of touch units. The process 60 comprises the following steps:

Step 600: Start.

Step 602: Alternately, electrically connect the touch units in each of a plurality of sensing areas.

Step 604: Determine a plurality of first capacitance variances of the plurality of sensing areas and determine a plurality of second capacitance variances of the plurality of touch units, separately, in each of the sensing areas, to sense the one or more touch signals.

Step 606: Adjust a frequency of alternately connecting the touch units in each of the sensing areas.

Step 608: End.

According to the process 60, the touch units in each of a plurality of sensing areas are alternately, electrically conducted (i.e. alternately switching between the normal mode and the grouping mode), to sense one or more touch signals from the touch device. In the grouping mode, the touch units in each of sensing areas are electrically connected together and a plurality of first capacitance variances of the plurality of sensing areas are determined. In the normal mode, the capacitance variance of each of touch units is acquired as one of a plurality of second capacitance variances. The one or more touch signals are sensed according to the first capacitance variances and the second capacitor variances.

The frequency of alternately conducting the touch units in each of the sensing areas is adjusted according to the first capacitance variances and the second capacitance variances in response to the one or more touch signals. For example, the touch units in each of the sensing areas are conducted 3 times per 10 times of scanning the capacitance variances in the touch device at first, to determine the second capacitance variances of the touch units are determined 7 times and the first capacitance variances of the sensing areas 3 times. When the first capacitance variances in response to the one or more touch signals are greater than a first threshold and the second capacitance variances in response to the one or more touch signals are greater than a second threshold, the frequency of alternately conducting the touch units in each of the sensing areas increases. For example, the touch units in each of the sensing areas change to be conducted 7 times per 10 times of scanning the capacitance variances in the touch device. When the first capacitance variances in response to the approaching or contact of the object is smaller than the first threshold and the second capacitance variances in response to the approaching or contact of the object maintain greater than the second threshold, the frequency of alternately conducting the plurality of touch units in each of the sensing areas decreases. For example, the touch units in each of the sensing areas change to be conducted 3 times per 10 times of scanning the capacitance variances in the touch device. Note that, the first threshold is greater than the second threshold because the number of the touch units generating each of the first capacitance variances is greater than that of the touch units generating each of the second capacitance variances. In an example, the first threshold is four times the second threshold when each of the sensing areas comprises 4 touch units.

It is noted that, the above mentioned embodiments utilize hardware mechanisms to implement different sensitivities. More specifically, in the embodiments shown in FIGS. 3 and 4, different switches controlling different groups including different amounts of touch units are conducted respectively to achieve different sensitivities. The sensitivity of the electronic system 40 determining the approaching or the contact of the object is higher than the sensitivity of the electronic system 30.

However, the idea of utilizing different groups/amounts of touch switches is not limited to any specific implementations. For example, the hardware mechanism utilizing switches may be extended to software mechanism which may not need physical switches. This means that any implementation that allows the touch information sensed by the touch units to be "grouped", e.g. summed, can be realized, wherein the sensing module can obtain the respective touch information from each of the touch units.

In other words, "grouping" may not necessarily occur physically by implementing the hardware switches which can be arranged to connect different groups of switches and may be conducted at different times. In some implementations, the "grouping" may occur virtually on processing the touch information (indicating capacitance variances in response to a touch event) by combining or summing the touch information. Different sensitivities can be achieved by summing the touch information from different numbers of touch units in each sensing area. A greater number of grouped touch units or summed sensing data can lead to a greater sensitivity.

On the other hand, the resolution may not necessarily be reduced when the sensitivity is increased. For example, touch information from m*n touch units can be summed for a larger sensitivity and touch information for (m/2)*(n/2) touch units can be summed for a smaller sensitivity. In a specific implementation, only one capacitance or capacitance variances or sensing data corresponding to one among four touch units in each sensing area can be used to obtain a lower sensitivity. And four capacitances or capacitance variances or sensing data corresponding to four touch units in each sensing area can be summed to obtain a higher (4 times) sensitivity. If the resolution of each unit of (m/2)*(n/2) touch units can be calculated to be four times of the resolution of each unit of m*n touch units, then the resolution of (m/2)*(n/2) touch units can be the same as the resolution of m*n touch units.

Figure 7A:
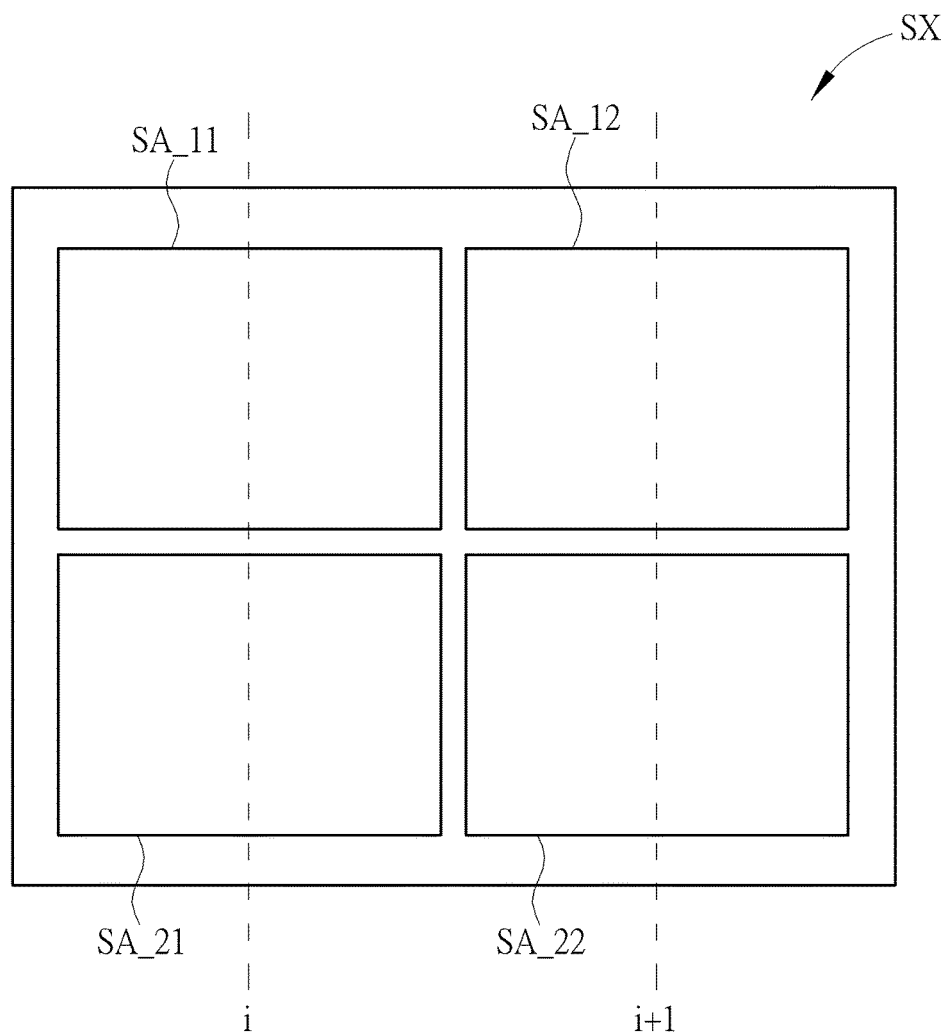
FIG. 7A is a schematic diagram for explaining an algorithm of calculating a centroid coordinate of a touch device.

Please refer to FIG. 7A, which is a schematic diagram for explaining an algorithm of calculating a centroid coordinate of a touch device. Assume that a sensing area SX of the touch device is located at an $i^{th}$ and $i+1^{th}$ column of the m*n touch units, and the sensing area SX includes sensing areas SA_11, SA_12, SA_21 and SA_22, wherein capacitances (or capacitance variances or sensing data) x1, x2, x3 and x4 respectively correspond to the sensing areas SA_11, SA_12, SA_21 and SA_22. The coordinate X can be calculated as (a*x1+b*x2)/(x1+x2), wherein a and b may denote coordinates of the sensing areas SA_11 and SA_12 along a row direction when x1 or x2 is the capacitance (capacitance variance) along the row direction. For example, the X coordinate of the centroid coordinate is X=(i*x1+(i+1)*x2)/(x1+x2). In other embodiments, X can be obtained as a weighted value of more than two coordinates (such as three coordinates) along the row direction. Similarly, an Y coordinate of the centroid coordinate may be determined according to capacitances or capacitance variances or sensing data corresponding to two or more sensing areas, such as, SA_11 and SA_21. Notably, the algorithm of the centroid coordinate is not limited to weighting, all kinds of methods for determining the centroid coordinate may be adopted in the present invention.

Figure 7B:
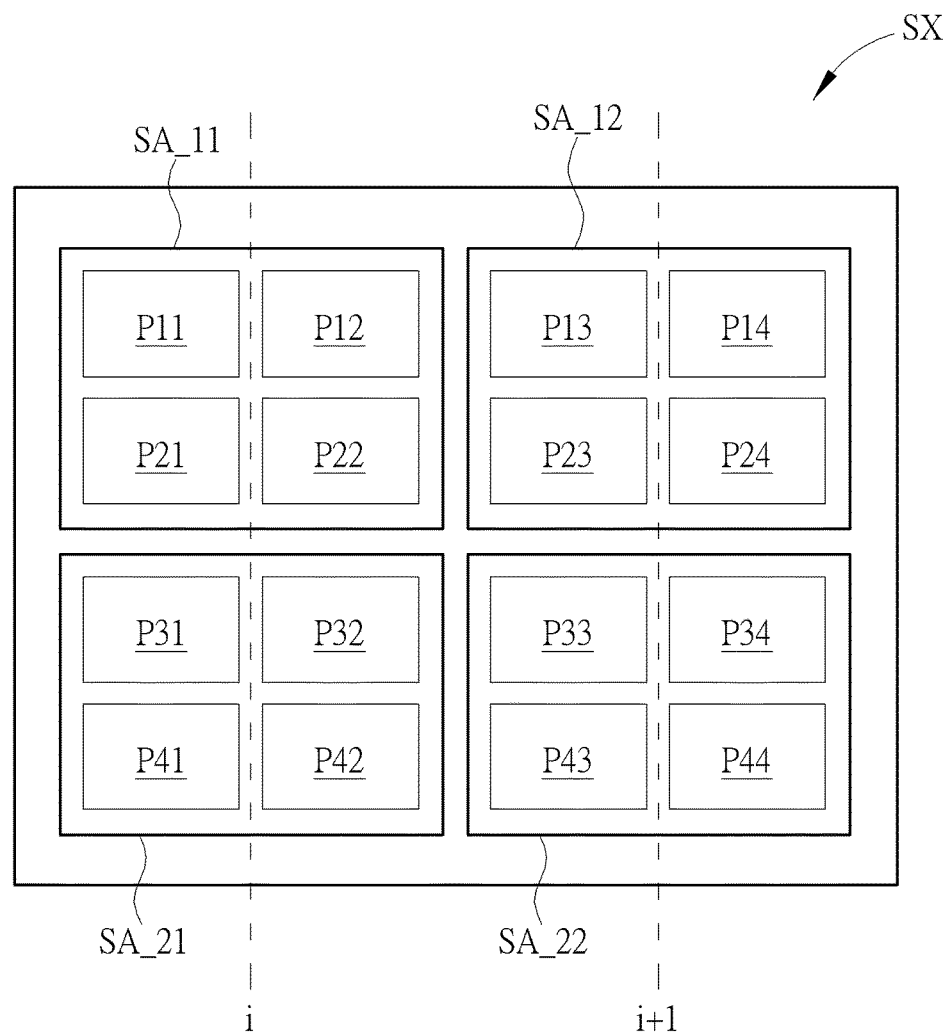
FIG. 7B is a schematic diagram of a sensing area according to an example of the present invention.

Please continue to refer to FIG. 7B, which is a schematic diagram of the sensing area SX according to an example of the present invention. The sensing areas SA_11, SA_12, SA_21 and SA_22 respectively include four touch units P11, P12, P21, P22, four touch units P13, P14, P23, P24, four touch units P 31, P32, P41, P42, and four touch units P33, P34, P43, P44. In a first embodiment when the sensitivity is increased to be four times while a resolution is decreased, the capacitance or capacitance variance or sensing data for each of the touch units P11, P12, P21 and P22 has a lower value or is varied in a smaller range. For example, the capacitance or sensing data for the sensing area SA_11 is calculated as (S11+S12+S21+S22)/4, wherein S11, S12, S21, S22 respectively denote the capacitance or sensing data corresponding to the touch units P11, P12, P21 and P22 within the sensing area SA_11. This may be achieved by electrically connecting the four touch units or alternatively by summing S11-S22 after respective touch signals are sensed from touch units. Similarly, the capacitance or sensing data for the sensing area SA_12 is calculated as (S13+S14+S23+S24)/4, wherein S13, S14, S23, S24 respectively denote the capacitance or sensing data corresponding to the touch units P13, P14, P23, P24 within the sensing area SA_12. And the X coordinate of the centroid coordinate may be therefore calculated as (a*x1+b*x2)/(x1+x2), wherein a and b may denote coordinates of the sensing areas SA_11 and SA_12 along a row direction when x1 or x2 is the capacitance (or largest capacitance variance) along the row direction. In addition, the Y coordinate of the centroid coordinate may be calculated in a similar way.

In a second embodiment, when the sensitivity is also increased to be four times while a resolution is maintained, the capacitance or sensing data for each sensing areas SA_11, SA_12, SA_21, or SA_22 has a larger value or is varied in a larger range compared to the first embodiment. For example, the capacitance or capacitance variance or sensing data for the sensing area SA_11 is calculated as (S11+S12+S21+S22), wherein S11, S12, S21, S22 respectively denote the capacitance or capacitance variance or sensing data corresponding to the touch units P11, P12, P21 and P22 within the sensing area SA_11. Similarly, the capacitance or sensing data for the sensing area SA_12 is calculated as (S13+S14+S23+S24), wherein S13, S14, S23, S24 respectively denote the capacitance or capacitance variance or sensing data corresponding to the touch units P13, P14, P23, P24 within the sensing area SA_12. And the X coordinate of the centroid coordinate may be therefore calculated as (a*x1+b*x2)/(x1+x2), wherein a and b may denote coordinates of the sensing areas SA_11 and SA_12 along a row direction when x1 or x2 is the largest capacitance (or capacitance variance) along the row direction. In addition, the Y coordinate of the centroid coordinate may be calculated in a similar way.

Comparing the first and second embodiments, it is noted that the way how the capacitance value (or capacitance variance value) for each sensing area is calculated can lead to a different resolution. This means that the resolution can remain the same or can be decreased/increased when the sensitivity is increased/decreased. More specifically, the second embodiment can have a resolution four times of the resolution of the first embodiment even when the sensitivity is both increased to be four times (2*2 touch units are utilized in calculating the capacitance for each sensing area). In other words, when the sensitivity of the touch device is increased by (virtually or physically) increasing the numbers of touch units in each sensing area (e.g., from one to four) used for calculating the capacitance (or capacitance variance or sensing data) corresponding to the sensing area, the resolution is decreased in the first embodiment. However, by having a greater range of capacitance variance, which can be achieved by not dividing the summation of capacitance values of the touch units by 4, the resolution can be maintained in the second embodiment.

Figure 8:
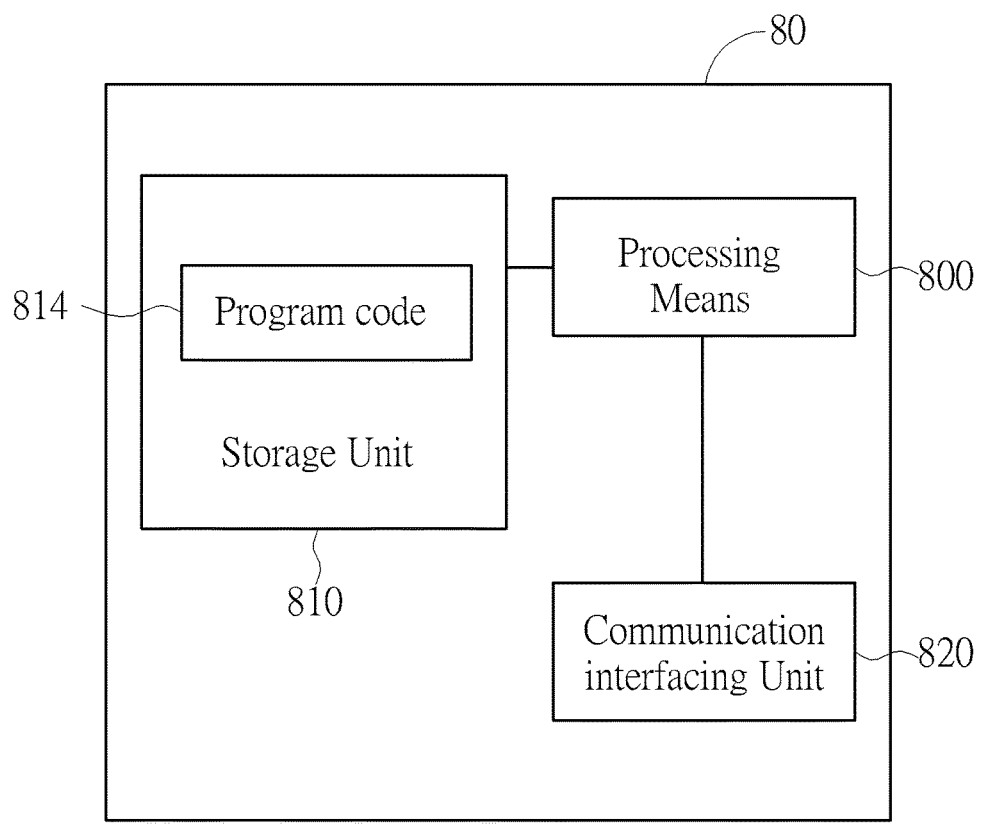
FIG. 8 is a schematic diagram of a computer system according to an example of the present invention.

In another embodiment, please refer to FIG. 8, which is a schematic diagram of a computer system 80 according to an example of the present invention. The computer system 80 may be utilized for realizing the image enhancement method stated above, but is not limited herein. The computer system 80 may include a processing means 800 such as a microprocessor or Application Specific Integrated Circuit (ASIC), a storage unit 810 and a communication interfacing unit 820. The storage unit 810 may be any data storage device that can store a program code 812, accessed and executed by the processing means 800. Examples of the storage unit 810 include but are not limited to a subscriber identity module (SIM), read-only memory (ROM), flash memory, random-access memory (RAM), CD-ROM/DVD-ROM, magnetic tape, hard disk and optical data storage device.

It is noted the disclosure is not limited to a self-capacitance touch method/device such as shown in the above embodiments but can also be applied to a mutual-capacitance touch method/device, which may comprise a sensing controller having a plurality of drive lines and a plurality of sense lines coupled to a plurality of touch units; a source for driving a current or voltage separately though each drive line; and a sensing circuit that monitors the capacitance at the sensing lines. One or more different numbers of touch units can be physically or virtually grouped so as to achieve different sensitivities. Furthermore, the disclosure is not limited to touch sensing device/method, but may be applied to different types of sensing device such as fingerprint sensing device/method. For example, a fingerprint sensor may include a FPR (fingerprint) sensing array including a plurality of FPR sensing units, a readout module, and a processor. Each of the FPR sensing units can include a FPR sensing electrode. The readout module can reads a sensing voltage of the FPR sensing electrode of each of the FPR sensing units, and provides a sensing output according to the sensing voltage. One or more different numbers of FPR sensing units can be physically or virtually grouped so as to achieve different sensitivities.

The touch control module of the above examples is capable of connecting multiple touch units, to increases the area of generating the capacitance variance. The sensitivity of the touch device is therefore increased. In addition, the power consumption of the electronic system is reduced because the number of times of scanning the capacitance variances decreases when the multiple touch units are connected together.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch control method for sensing one or more touch signals from a touch device having a plurality of sensing areas, each of the sensing areas having a plurality of touch units, the touch control method comprising:
   determining a sensitivity of the touch device; and
   sensing the one or more the touch signals from the touch device, wherein one or more of the plurality of touch units located in the same sensing area are grouped so as to achieve the sensitivity, and for a first sensitivity of the touch device, a first number of one or more touch units are grouped in the same sensing area, and for a second sensitivity of the touch device, a second number of one or more touch units are grouped in the same sensing area, and the second sensitivity is greater than the first sensitivity and the second number is greater than the first number;
   wherein a resolution of the touch device maintains when the sensitivity of the touch device is varied.

2. The touch control method of claim 1, wherein the grouping comprises electrically connecting the one or more touch units located in the same sensing area before the one or more touch signals are sensed from the touch device.

3. The touch control method of claim 1, wherein the grouping comprises summing sensing data of the one or more touch units located in the same sensing area after the one or more the touch signals are sensed from the touch device.

4. The touch control method of claim 1, wherein the plurality of sensing areas are at least one of rectangles, circles or half-circles.

5. The touch control method of claim 1, wherein the step of determining the sensitivity of the touch device comprises:
determining to increase the sensitivity of the touch device when the touch device performs a specific function for a specific application requiring a higher sensitivity.

6. The touch control method of claim 1, wherein the step of determining the sensitivity of the touch device comprises:
determining to increase the sensitivity of the touch device when the one or more touch signals perform a predefined touch pattern.

7. The touch control method of claim 6, wherein the predefined touch pattern is a move pattern of the object.

8. The touch control method of claim 6, wherein the predefined touch pattern is a contact pattern of the object.

9. The touch control method of claim 1, wherein the step of determining the sensitivity of the touch device comprises:
determining amplitudes of capacitance variances in response to the one or more touch signals and generated by each of the touch units of each of the sensing areas; and
determining to increase the sensitivity of the touch device when receiving an emitting signal in a frequency band and the capacitance variances in response to the one or more touch signal is greater than a threshold.

10. The touch control method of claim 1, wherein the step of determining the sensitivity of the touch device comprises:
determining to increase the sensitivity of the touch device when the touch device enters a power saving mode.

11. A touch control method for sensing one or more touch signals from a touch device having a plurality of sensing areas, each of the sensing areas having a plurality of touch units, the touch control method comprising:
calculating a first sensing value according to a first plurality of touch signals from a first number of one or more touch units located in the same sensing area to provide a first sensitivity of the touch device; and
calculating a second sensing value according to a second plurality of touch signals from a second number of one or more touch units located in the same sensing area to provide a second sensitivity of the touch device,
wherein the second sensitivity is greater than the first sensitivity, and the second number is greater than the second number;
wherein a resolution of the touch device maintains when the sensitivity of the touch device is varied.

12. A computer system, comprising:
a processing device; and
a memory device coupled to the processing device, for storing a program code instructing the processing device to perform a touch control method,
wherein the touch control method comprises:
determining a sensitivity of the touch device;
grouping one or more of a plurality of touch units located in the same sensing area so as to achieve the sensitivity of the touch device; and
sensing the one or more the touch signals from the touch device;
wherein a resolution of the touch device maintains when the sensitivity of the touch device is varied.

13. A non-transitory machine-readable medium having information recorded thereon for rendering touch units of a touch device,
wherein the information, when read by the machine, causes the machine to perform the following:
determining a sensitivity of the touch device;
grouping one or more of touch units located in the same sensing area so as to achieve the sensitivity of the touch device; and
sensing the one or more touch signals from the touch device;
wherein a resolution of the touch device maintains when the sensitivity of the touch device is varied.

14. A control logic coupled to a touch device, configured to receive touch information and render the touch information into control signals for driving the touch device, to perform the following:
determining a sensitivity of the touch device;
grouping one or more of touch units located in the same sensing area so as to achieve the sensitivity of the touch device; and
sensing the one or more touch signals from the touch device;
wherein a resolution of the touch device maintains when the sensitivity of the touch device is varied.

15. A touch control module for sensing one or more touch signals from a touch device having a plurality of touch units, the touch control module comprising:
a sensing module, coupled to the touch units, and configured to obtain the one or more touch signals from the touch device, and generate a sensing result based on the one or more touch signals;
wherein under an operation of a first sensitivity of the touch device, the sensing module generates a sensing result based on the one or more touch signals from the touch units which are divided into a first number of one or more sensing areas each including a first number of one or more touch units of the touch units, and under an operation of a second sensitivity of the touch device, the sensing module generates a sensing result based on the one or more touch signals from the touch units which are divided into a second number of sensing areas each including a second number of one or more touch units of the touch units;
wherein the first sensitivity is different from the second sensitivity and the first number is different from the second number, such that different numbers of touch units are used to provide touch information and the touch device therefore has different sensitivities;
wherein a resolution of the touch device maintains when the sensitivity of the touch device is varied.

16. The touch control module of claim 15, wherein the first number of one or more touch units are m1*n1 touch units, and the second number of one or more touch units are m2*n2 touch units, wherein m1, m2, n1 and n2 are positive integers and at least one of m1 and n1 is different respectively from m2 and n2.

17. A touch control method for sensing one or more touch signals from a touch device having a plurality of sensing areas, each of the sensing areas having a plurality of touch units, the touch control method comprising:
determining a sensitivity of the touch device; and
sensing the one or more touch signals from the touch device, wherein one or more of the plurality of touch units located in the same sensing area are grouped so as to achieve the sensitivity, and for a first sensitivity of the touch device, a first number of one or more touch units are grouped in the same sensing area, and for a second sensitivity of the touch device, a second number of one or more touch units are grouped in the same sensing area, and the second sensitivity is greater than the first sensitivity and the second number is greater than the first number;

wherein the step of determining the sensitivity of the touch device comprises:

determining to increase the sensitivity of the touch device when the one or more touch signals perform a predefined touch pattern, wherein the determination comprises determine whether the one or more touch signals perform a touch pattern having a contact area larger than a predetermined area;

wherein a resolution of the touch device maintains when the sensitivity of the touch device is varied.

18. The touch control method of claim 17, wherein the predetermined area is a predetermined ratio of a total touch area of the touch device.

19. A touch control method for sensing one or more touch signals from a touch device having a plurality of sensing areas, each of the sensing areas having a plurality of touch units, the touch control method comprising:

determining a sensitivity of the touch device; and sensing the one or more touch signals from the touch device, wherein one or more of the plurality of touch units located in the same sensing area are grouped so as to achieve the sensitivity, and for a first sensitivity of the touch device, a first number of one or more touch units are grouped in the same sensing area, and for a second sensitivity of the touch device, a second number of one or more touch units are grouped in the same sensing area, and the second sensitivity is greater than the first sensitivity and the second number is greater than the first number; wherein the step of determining the sensitivity of the touch device comprises:

determining to increase the sensitivity of the touch device when the touch device performs a specific function for a specific application requiring a higher sensitivity;

wherein a resolution of the touch device maintains when the sensitivity of the touch device is varied.

20. A touch control method for sensing one or more touch signals from a touch device having a plurality of sensing areas, each of the sensing areas having a plurality of touch units, the touch control method comprising:

determining a sensitivity of the touch device; and sensing the one or more touch signals from the touch device, wherein one or more of the plurality of touch units located in the same sensing area are grouped so as to achieve the sensitivity, and for a first sensitivity of the touch device, a first number of one or more touch units are grouped in the same sensing area, and for a second sensitivity of the touch device, a second number of one or more touch units are grouped in the same sensing area, and the second sensitivity is greater than the first sensitivity and the second number is greater than the first number; wherein the step of determining the sensitivity of the touch device comprises:

determining to increase the sensitivity of the touch device determining to increase the sensitivity of the touch device when the one or more touch signals perform a predefined touch pattern, wherein the predefined touch pattern comprises a move pattern of an object having a specific moving pattern;

wherein a resolution of the touch device maintains when the sensitivity of the touch device is varied.

* * * * *